United States Patent [19]
Markham et al.

[11] Patent Number: 5,947,061
[45] Date of Patent: Sep. 7, 1999

[54] PET TOY PRODUCT WITH INTEGRAL TREATS RECEIVING RECEPTACLES

[75] Inventors: Joseph P. Markham, Arvada; Brent P. Johnson, Littleton; Gary D. Fields, Parker, all of Colo.

[73] Assignee: Bounce, Inc., Golden, Colo.

[21] Appl. No.: 08/972,549

[22] Filed: Nov. 18, 1997

Related U.S. Application Data

[63] Continuation-in-part of application No. 08/663,447, Jun. 13, 1996, abandoned.

[51] Int. Cl.$^6$ ................................................ A01K 29/00
[52] U.S. Cl. ............................................................ 119/710
[58] Field of Search .................................. 119/709, 710, 119/711, 51.03

[56] References Cited

U.S. PATENT DOCUMENTS

| | | | |
|---|---|---|---|
| Re. 34,352 | 8/1993 | Markham et al. | 119/710 |
| D. 188,179 | 6/1960 | Tay | D12/2 |
| D. 387,513 | 12/1997 | Mauldin, Jr. | D30/160 |
| D. 388,559 | 12/1997 | Mauldin, Jr. | D30/160 |
| D. 393,110 | 3/1998 | Mauldin, Jr. | D30/160 |
| 1,022,113 | 4/1912 | Smith | 119/711 |
| 1,149,170 | 8/1915 | Allis . | |
| 1,534,964 | 4/1925 | Kahnweiler | 119/711 |
| 2,194,736 | 3/1940 | de Bruler . | |
| 2,610,851 | 9/1952 | Jones | 119/709 X |
| 3,104,648 | 9/1963 | Fisher . | |
| 3,664,303 | 5/1972 | Baensch | 119/51.03 |
| 3,871,334 | 3/1975 | Axelrod . | |
| 3,899,607 | 8/1975 | Miller et al. | 426/285 |
| 4,032,665 | 6/1977 | Miller et al. | 426/104 |
| 4,513,014 | 4/1985 | Edwards | 426/132 |
| 4,557,219 | 12/1985 | Edwards . | |
| 4,802,444 | 2/1989 | Markham et al. | 119/709 X |
| 5,025,753 | 6/1991 | Schneider | 119/51.03 |
| 5,536,007 | 7/1996 | Snyder | 119/709 X |
| 5,553,570 | 9/1996 | VanNatter, III et al. | 119/709 |
| 5,799,616 | 9/1998 | McClung, III | 119/709 |
| 5,813,366 | 9/1998 | Mauldin, Jr. | 119/710 |

OTHER PUBLICATIONS

Jungle Talk International advertisement.
Buster Cube.
"Recipe for the Perfect Dog" brochure.

*Primary Examiner*—Robert P. Swiatek
*Attorney, Agent, or Firm*—Fields and Johnson, P.C.

[57] ABSTRACT

A pet toy product for holding one or more animal treats has a body member having an outer surface with one or more recesses for removably holding one or more animal treats. The recesses may be of varying depth so that the treats in the deeper recesses are more difficult for the animal to extract than are the treats in the shallower recesses. The recesses may be circular, triangular, irregular, in the form of a groove or any other suitable configuration. The outer surface of the toy may be raised to accommodate the recesses or the recesses may extend into the surface. The pet toy may have recesses forming openings which extend through the side wall of the pet toy product for receiving treats. With the structure recited, the pet owner can replenish the treats as often as necessary to maintain the pet's interest in the toy. Different treats can be provided with different nutritional values and tastes. Because some treats will be more difficult for the animal to remove than others, the animal can be kept occupied for several hours before the treats need to be replaced again. The treats may be held in the recesses by friction, adhesive or adhesion.

45 Claims, 8 Drawing Sheets

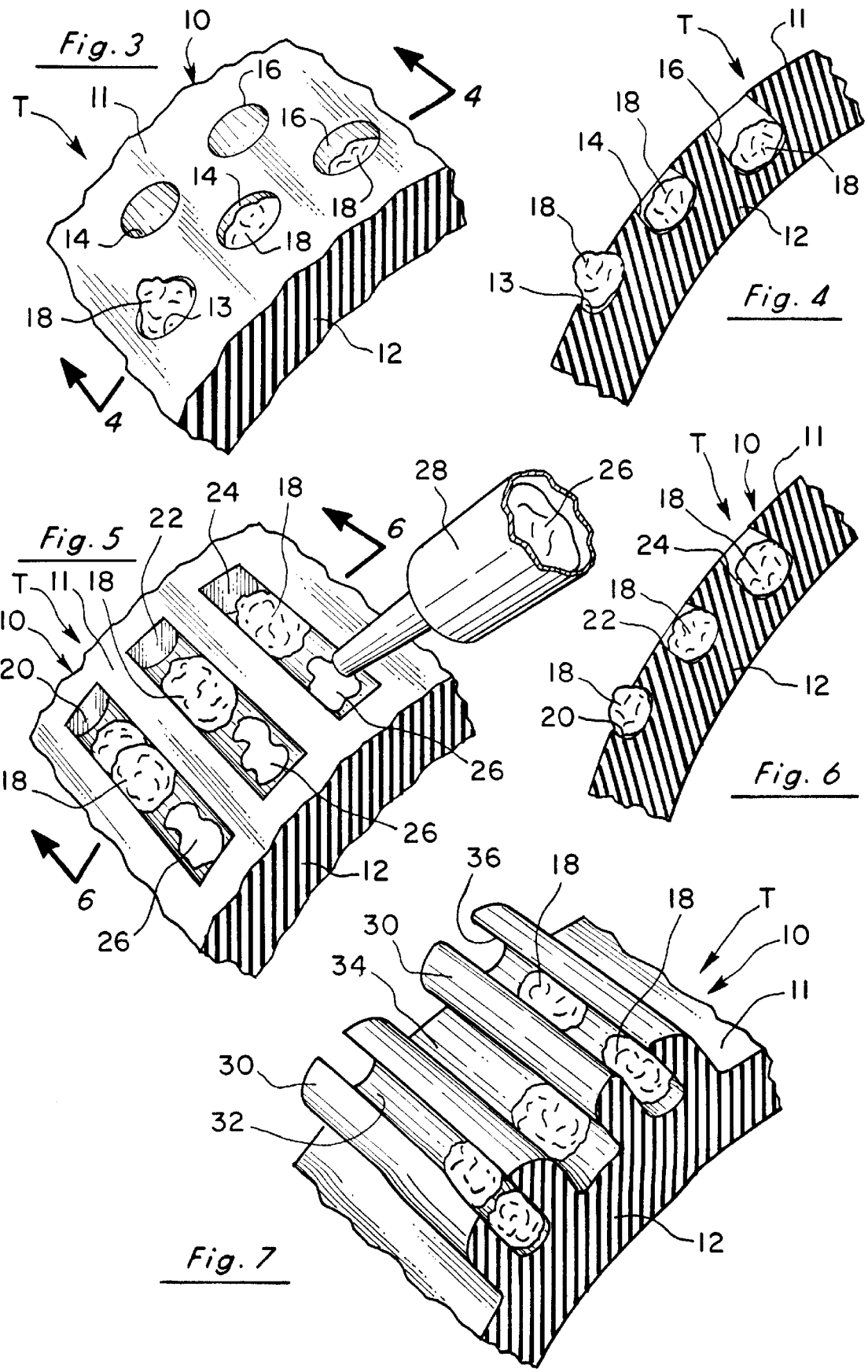

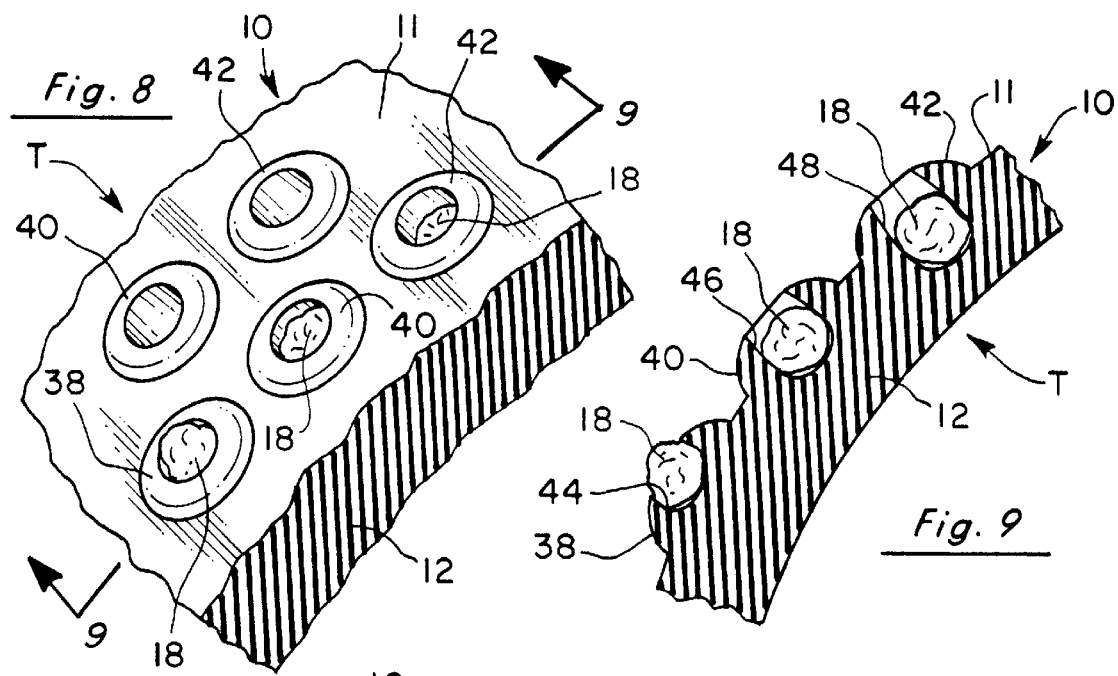
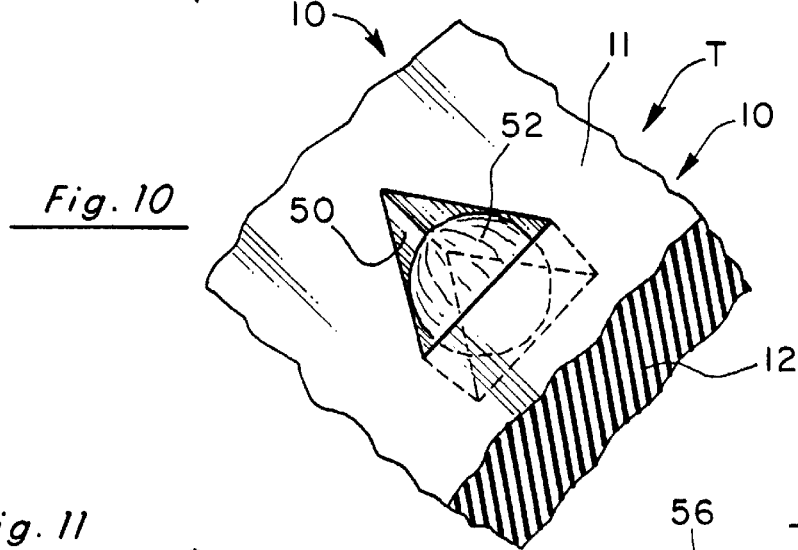
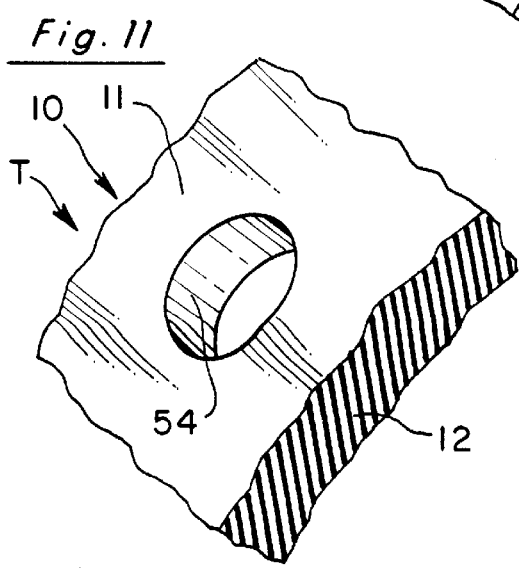
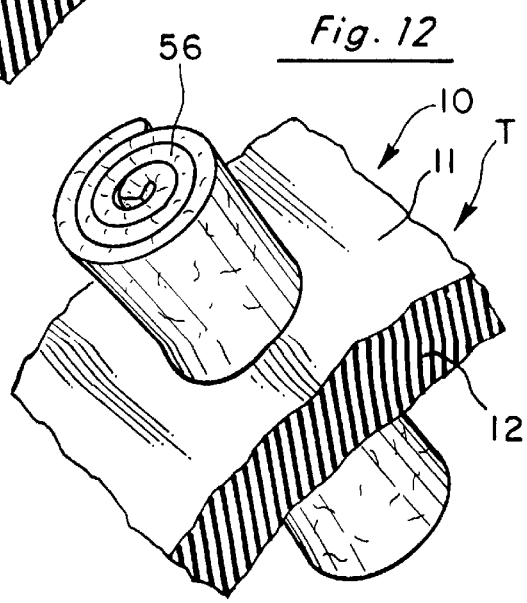

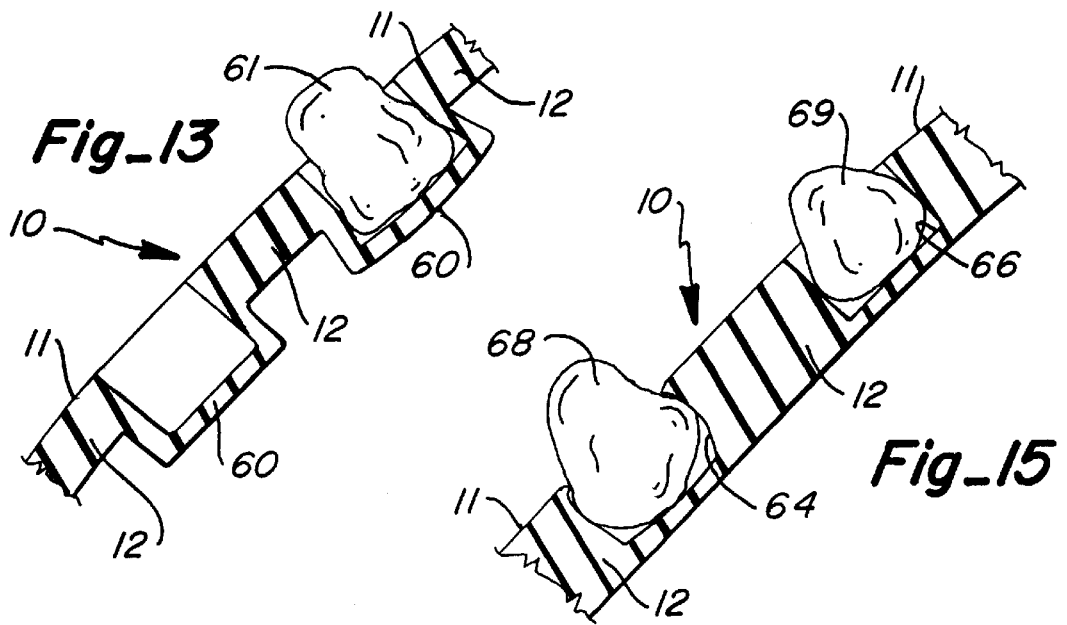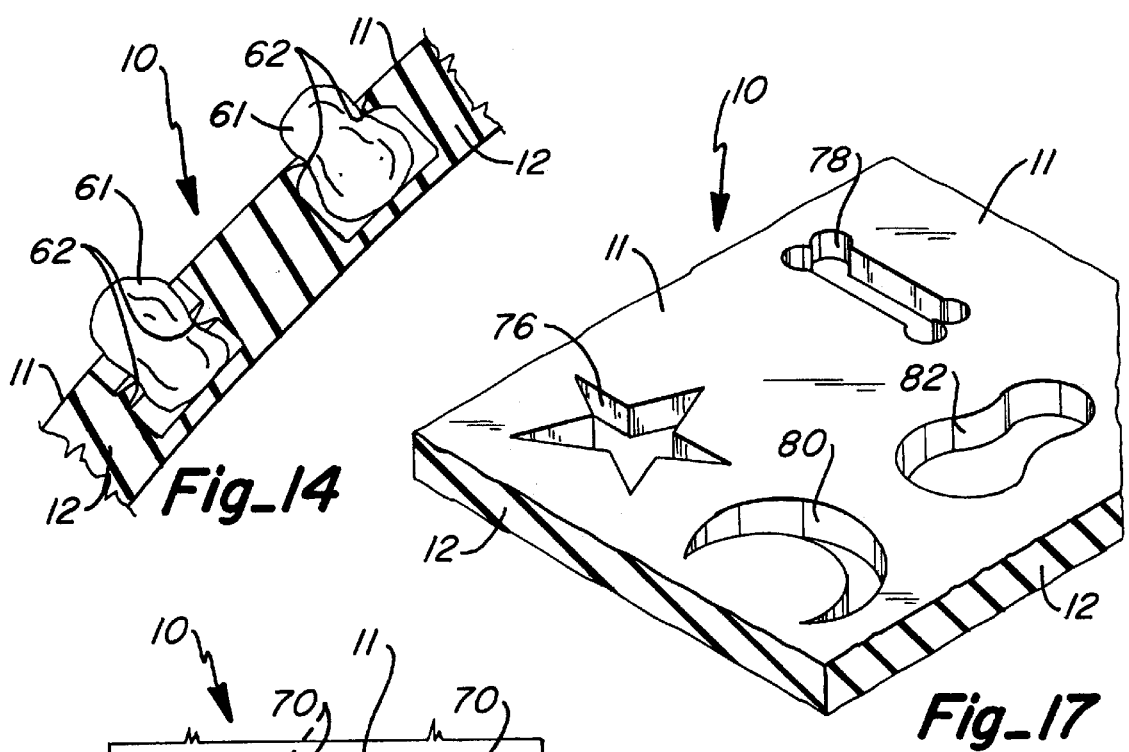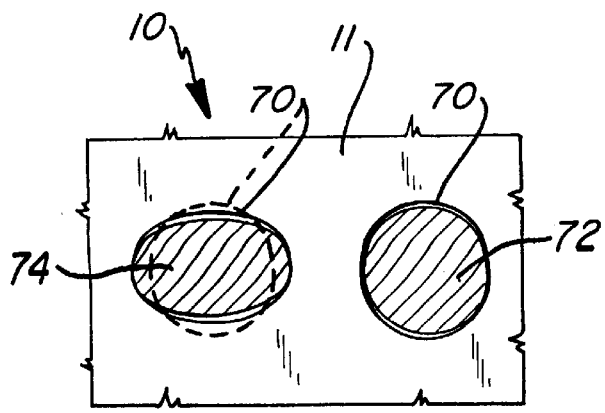

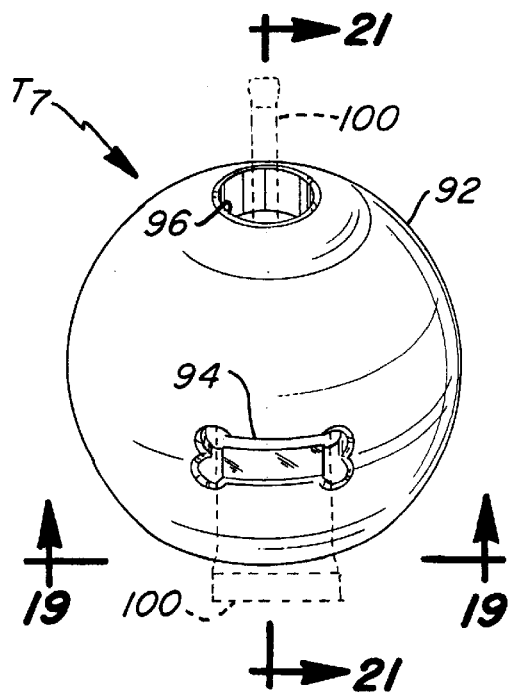
Fig_18
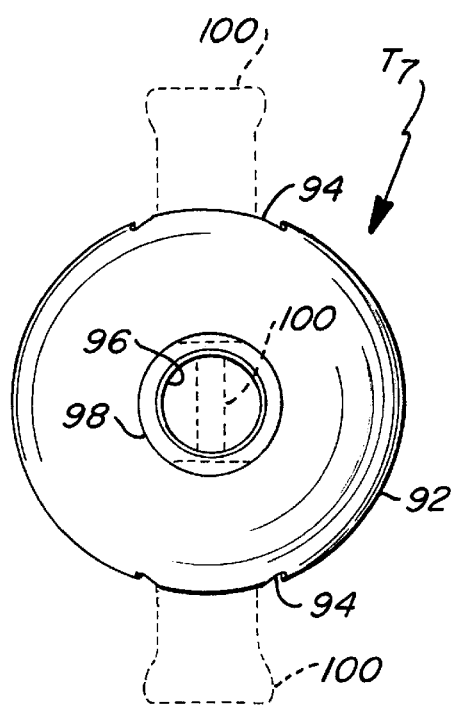
Fig_19
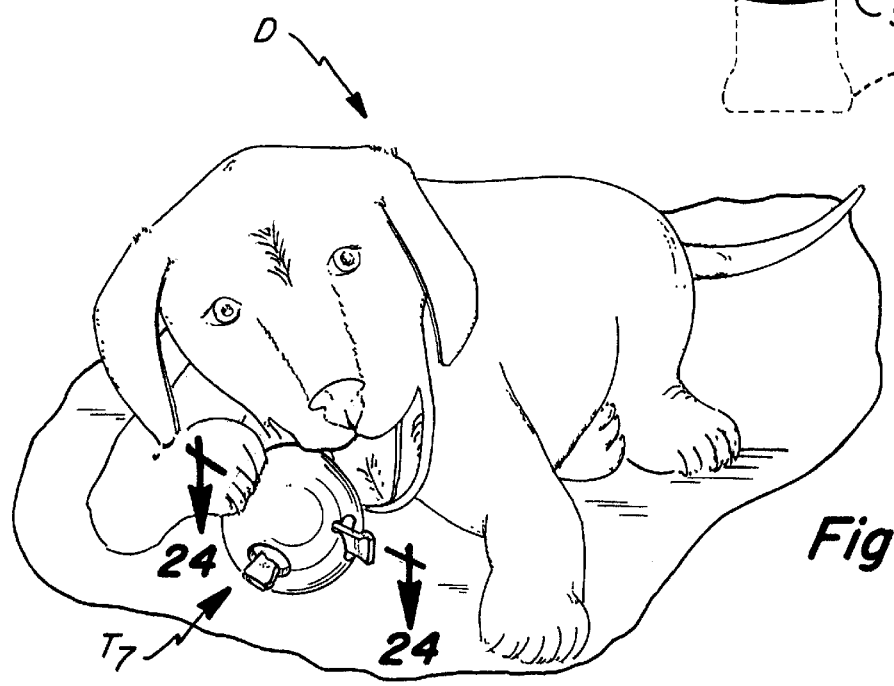
Fig_20

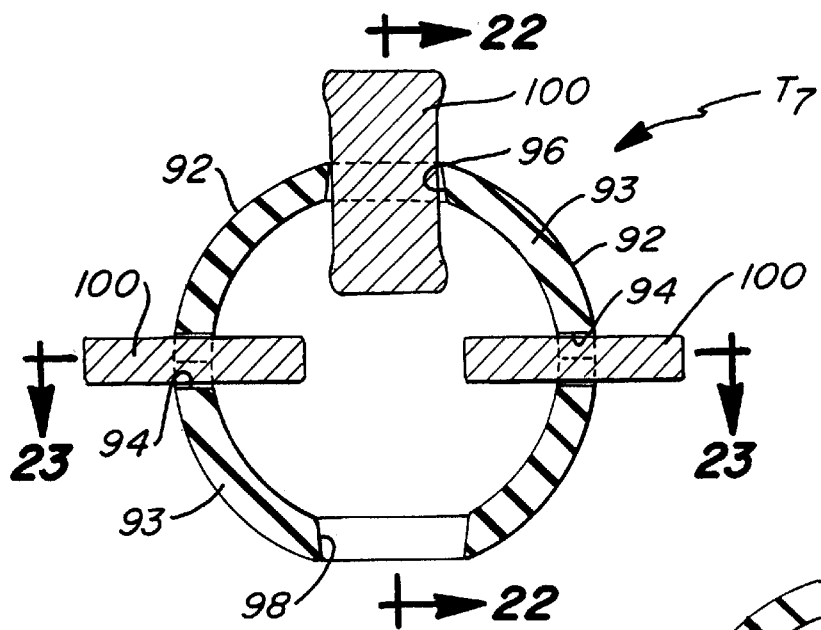
Fig_21
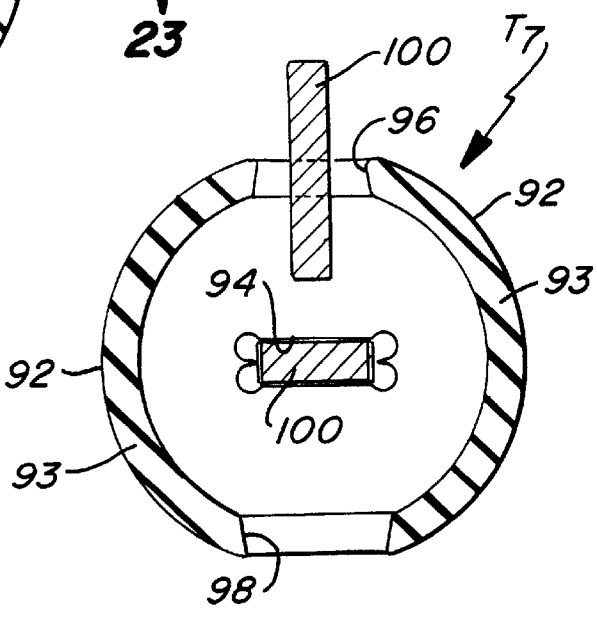
Fig_22
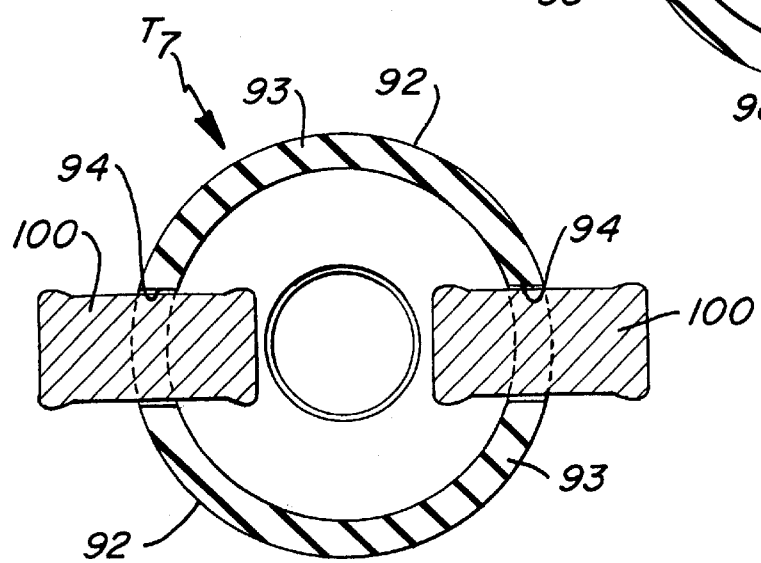
Fig_23

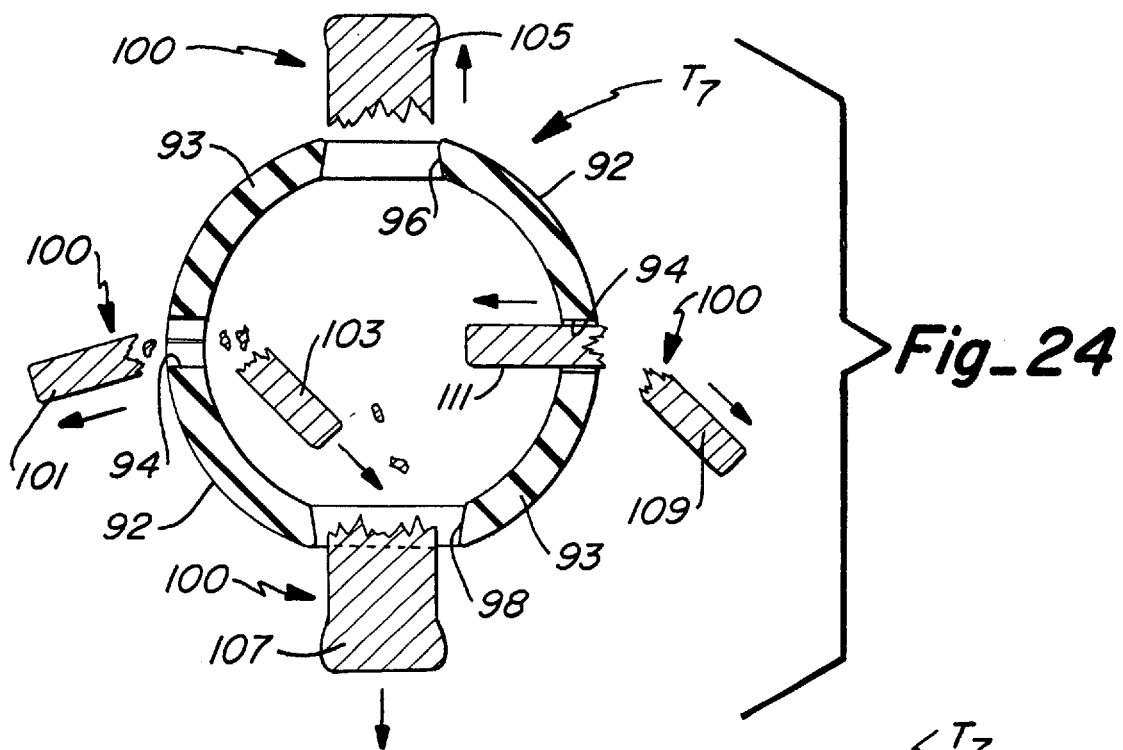
Fig_24
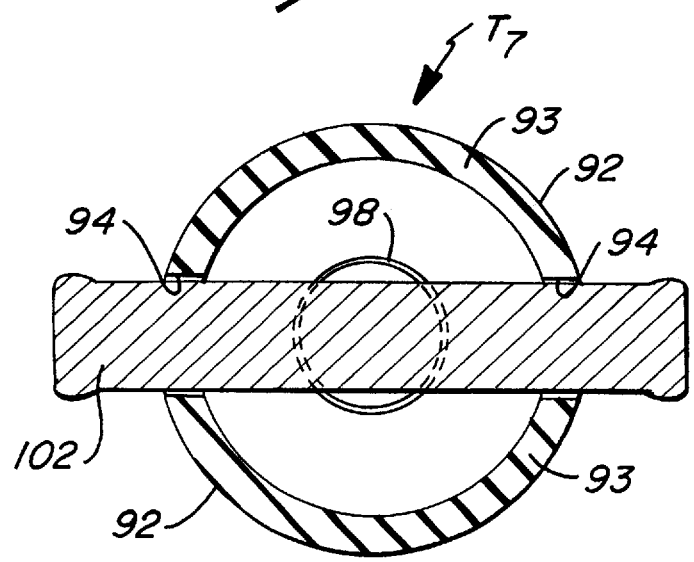
Fig_25

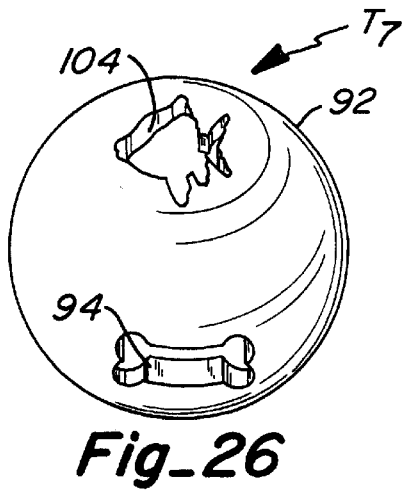
Fig_26
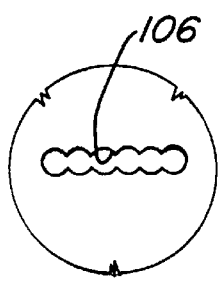
Fig_27
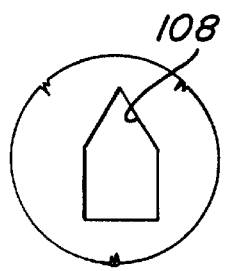
Fig_28
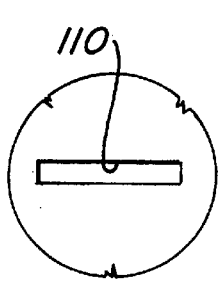
Fig_29
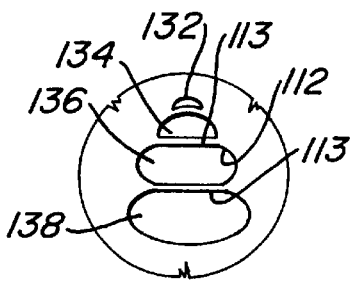
Fig_30
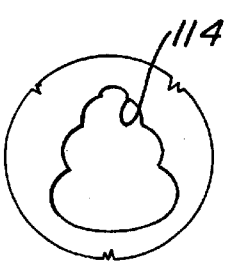
Fig_31
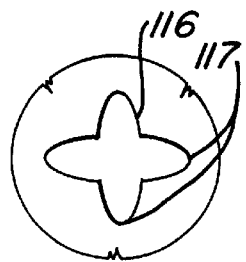
Fig_32
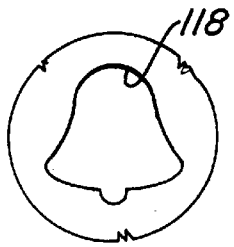
Fig_33
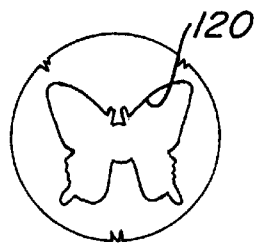
Fig_34
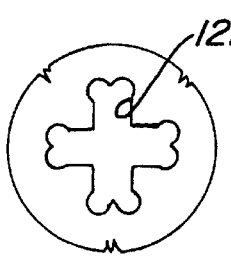
Fig_35
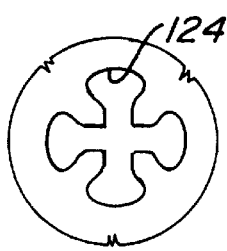
Fig_36
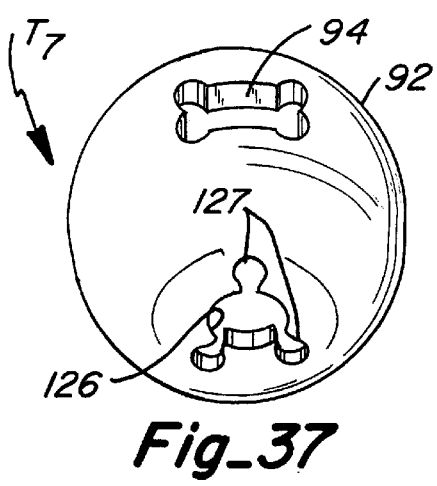
Fig_37
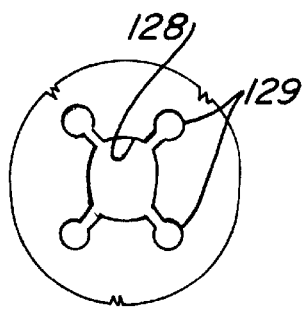
Fig_38
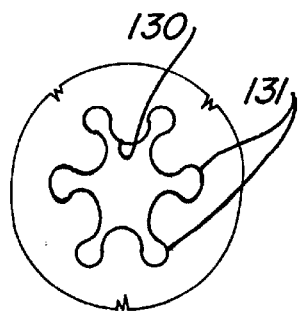
Fig_39

PET TOY PRODUCT WITH INTEGRAL TREATS RECEIVING RECEPTACLES

This patent application is a continuation-in-part of U.S. Ser. No. 08/663,447, filed Jun. 13, 1996, now abandoned and entitled "Pet Toy Product With Integral Treats Receiving Receptacles."

TECHNICAL FIELD

This invention relates to a pet toy product, and more particularly to a pet toy product having recesses and openings for receiving treats.

BACKGROUND ART

Chewable pet toys have been available for many years. Many are impregnated with odors or flavoring materials which are attractive to the animal for which the toy is intended. These toys can be made of various materials, such as rawhide, rubber and plastic. The shortcoming of these products is that after a period of time, the flavor and/or odor becomes less strong and the animal loses interest in the toy. No means is provided for subsequently enhancing the flavor and odor of the toy.

Additionally, many toys which are impregnated with the odors or flavorings are not intended to be consumed by the animal. However, because of the stimulation provided to the animal, it may consume the entire pet toy which may cause the animal to choke or to experience fatal gastrointestinal problems by ingesting the toy.

Tay (U.S. Des. Pat. No. 188,179) discloses a pet food holder which has a hollow center for holding food.

Allis (U.S. Pat. No. 1,149,170); Jones (U.S. Pat. No. 260,851); and Edwards (U.S. Pat. Nos. 4,513,014 and 4,557,219) each disclose a pet toy having a flavoring material impregnated therein.

Fisher (U.S. Pat. No. 3,104,648) discloses a pet toy which is odor impregnated.

Markham (U.S. Pat. No. Re. 34,352) discloses a therapeutic pet toy having parallel peripheral grooves in which oral hygiene substances may be placed.

Axlerod (U.S. Pat. No. 3,871,334) and Miller (U.S. Pat. Nos. 3,899,607 and 4,032,665) each disclose pet toys which are both flavor and odor impregnated.

Jungle Talk International sells a product for birds made of wood which has openings in which nuts are firmly fixed. The bird must substantially destroy the wood in order to reach the nuts. Thus, the product cannot be reloaded and reused.

A product known as a "Buster Cube" has an opening in which dry dog food is poured. As a dog knocks it over in playing with it, the food runs out so that the dog can eat it.

Although each of these inventions is suitable for its intended purpose, none provide means on the exterior surface thereof for holding animal treats for keeping the animal interested in the toy.

DISCLOSURE OF THE INVENTION

In accordance with the present invention, a pet toy product is provided for holding, by friction or adhesion, one or more animal treats wherein the toy has a body member having an outer surface with one or more recesses for receiving one or more animal treats. The term "treat" is intended to include any items which are attractive to or are consumed by an animal. The recesses may be of varying depth so that the treats in the deeper recesses are more difficult for the animal to extract than are the treats in the shallower recesses. The recesses may be circular, triangular, irregular, or in the form of a groove or any other suitable configuration. The outer surface of the toy may be raised to accommodate the recesses or the recesses may extend into the surface. Also, the pet toy may have a recess forming an opening which extends completely through the side wall for receiving a treat. With the structure recited, the pet owner can replenish the treats as often as necessary to maintain the pet's interest in the toy. Different treats can be provided with different nutritional values and tastes. Also, because some treats will be harder for the animal to remove than others, the animal can be kept occupied for several hours before the treats need to be replaced again. The toy may be made of molded rigid or flexible material which can accommodate different types of treats. This construction allows the toy to be used repeatedly by refilling the recesses with more treats.

Additional advantages will become apparent from the description which follows, taken in conjunction what the accompanying drawings.

BRIEF DESCRIPTION OF THE DRAWINGS

FIG. 3 is a fragmentary perspective view of a portion of a first embodiment of the pet toy product of this invention showing recesses of varying depth containing animal treats;

FIG. 4 is a lateral section, taken along line 4—4 of FIG. 3, showing the different depths of the recesses with treats therein;

FIG. 5 is a fragmentary perspective view of a portion of a second embodiment of the pet toy product of this invention having longitudinal grooves for receiving animal treats and showing a liquid treat being inserted into the grooves;

FIG. 6 is a lateral section, taken along line 6—6 of FIG. 5, showing the different depths of the recesses with treats therein;

FIG. 7 is a fragmentary perspective view of a portion of a third embodiment of the pet toy product of this invention having longitudinal grooves which praised above the surface of the toy;

FIG. 8 is a fragmentary perspective view of a portion of a fourth embodiment of the pet toy product of this invention having a plurality of recesses formed in a plurality of raised areas;

FIG. 9 is a lateral section, taken along line 9—9 of FIG. 8, showing the different depths of the recesses with treats therein;

FIG. 10 is a fragmentary perspective view of a portion of a fifth embodiment of the pet toy product of this invention having a triangular recess;

FIG. 11 is a fragmentary perspective view of a portion of a sixth embodiment of the pet toy product of this invention having a recess extending through the side wall of the pet toy to form an opening for receiving an animal treat;

FIG. 12 is a fragmentary perspective view, similar to FIG. 11, but showing a treat positioned within the opening;

FIG. 13 is a lateral section, similar to FIGS. 4 and 6, illustrating a fifth embodiment of the pet toy product of this invention having a plurality of recesses which include flexible cups;

FIG. 14 is a lateral section, similar to FIG. 13, illustrating another embodiment of the pet toy product of this invention having a plurality of recesses with grippers or extensions formed within the recesses;

FIG. 15 is a lateral section, illustrating how a recess may be expanded because of its flexible characteristic to accommodate differing sized treats;

FIG. 16 is a plan view of any of the embodiments illustrating how the recesses may deform or expand to accommodate treats having different sizes and shapes;

FIG. 17 is a fragmentary perspective view of any of the embodiments illustrating a portion of the pet toy product having a star-shaped recess, a bone-shaped recess, a peanut-shaped recess, and a crescent-shaped recess; the recesses extending either completely through the side wall to form an opening, or only extending partially through the side wall;

FIG. 18 is a perspective view of another embodiment of the pet toy product of this invention;

FIG. 19 is a plan view taken along line 19—19 of FIG. 18 of the embodiment of FIG. 18;

FIG. 20 is a perspective view of a dog occupied with the pet toy product of FIG. 18 which has one or more treats inserted through recesses in the pet toy;

FIG. 21 is a vertical section, taken along line 21—21 of FIG. 18, illustrating interior details of the embodiment;

FIG. 22 is another vertical section, taken along line 22—22 of FIG. 21, illustrating additional interior details of the embodiment;

FIG. 23 is a lateral section, taken along line 23—23 of FIG. 21, further illustrating interior details of the embodiment;

FIG. 24 is yet another vertical section, taken along line 24—24 of FIG. 20, illustrating how pet treats may be dislodged from within or broken away from the pet toy;

FIG. 25 is a lateral section, similar to FIG. 23, illustrating a pet treat which extends continuously between opposing recesses formed on the pet toy product;

FIG. 26 is a perspective view of one modification of the embodiment illustrated in FIG. 18, wherein the upper opening has the shape of a fish;

FIG. 27 is a fragmentary plan view illustrating an upper opening having an irregular slot shape;

FIG. 28 is a fragmentary plan view illustrating an upper opening having a combination triangle and rectangle;

FIG. 29 is a fragmentary plan view illustrating an upper opening having a slot with parallel slides;

FIG. 30 is a fragmentary plan view illustrating an upper opening having a KONG®-shape including dividers;

FIG. 31 is a fragmentary plan view illustrating an upper opening having a KONG®-shape without dividers;

FIG. 32 is a fragmentary plan view illustrating an upper opening having a cross-shape with rounded ends;

FIG. 33 is a fragmentary plan view illustrating an upper opening having a bell-shape;

FIG. 34 is a fragmentary plan view illustrating an upper opening having a butterfly-shape;

FIG. 35 is a fragmentary plan view illustrating an upper opening having a cross-shape;

FIG. 36 is a fragmentary plan view illustrating an upper opening having a modified cross-shape;

FIG. 37 is a perspective view of one modification of the embodiment of FIG. 18, illustrating the lower opening having an irregular shape;

FIG. 38 is a fragmentary plan view of FIG. 37, illustrating another irregular lower opening; and FIG. 39 is another fragmentary plan view illustrating yet another irregular lower opening.

BEST MODE FOR CARRYING OUT THE INVENTION

Figure 1:
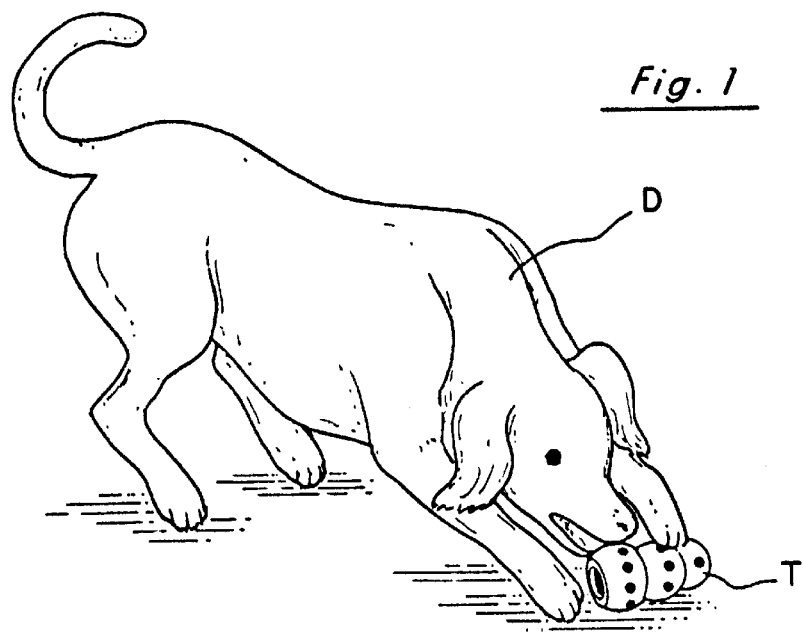
FIG. 1 is an illustration of an animal playing with one form of the present invention.
Figure 2:
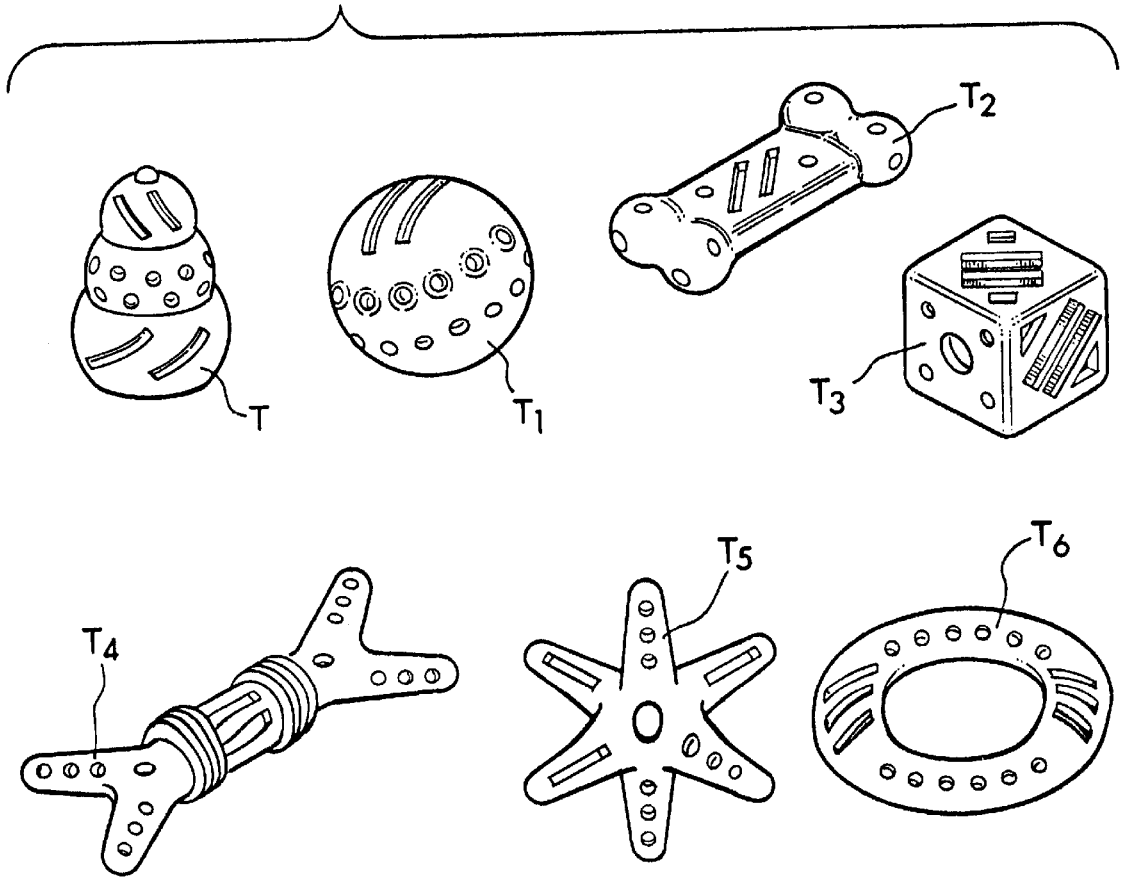
FIG. 2 is a perspective view of a variety of forms of pet toy products embodying the invention.

In accordance with this invention, an animal, such as dog D, is shown in FIG. 1 playing with the pet toy product T of this invention. As best seen in FIG. 2, the pet toy product may have a variety of configurations, such as ball $T_1$, bone-shaped pet toy product $T_2$, box-shaped pet toy product $T_3$, elongated pet toy product $T_4$, star-shaped pet toy product $T_5$ and annular pet toy product $T_6$. The recesses shown in these pet toy products can be of varying depths, as described below. These configurations are exemplary only and other configurations will be apparent to one of ordinary skill in the art and such other shapes are intended to be included within the scope of this invention.

One embodiment of pet toy product T is shown in FIGS. 3 and 4. The pet toy product T includes a body member 10 with an outer surface 11 which generally defines the shape of the pet toy product T, which may have a hollow interior volume. Body member 10 has a depth defined by side wall 12 which includes a plurality of depressions or recesses, such as shallow recess 13, medium recess 14 and deep recess 16. Each of the respective recesses has an animal treat 18 which may be inserted therein. The treat can be wedged into a recess in a rigid toy product or can be resiliently gripped by the side surfaces of a flexible product. In other words, the treat is releasably and frictionally held in the recess. An adhesive could also be used to attach the treat within the recess. For example, this treat can be dry pet food. The animal can readily remove the treat 18 from shallow recess 13, but must work harder to recover the treat 18 in medium recess 14. Likewise, the animal must work extra hard to remove treat 18 within deep recess 16.

Another embodiment of pet toy product T is shown in FIGS. 5 and 6. Specifically, side wall 12 is provided with a plurality of grooves, such as shallow groove 20, medium groove 22 and deep groove 24. A treat 18 can be placed in each of these grooves so that the animal experiences different levels of difficulty in the recovery of the treats from the respective grooves. Additionally, a second liquid or paste treat 26, such as peanut butter or soft cheese, can be placed in the grooves, as from a dispenser 28. This type of treat will be retained by adhesion. This allows the animal to enjoy more than one treat with the same toy.

A further embodiment of the invention is shown in FIG. 7 wherein the side wall 12 of pet toy product T is provided with raised portions 30 which form laterally spaced grooves 32, 34 and 36, respectively. As shown, these grooves can be supplied with one or more treats 18.

A still further embodiment of this invention is shown in FIGS. 8 and 9 wherein the side wall 12 of pet toy product T has a plurality of raised portions 38, 40 and 42. Raised portion 38 has a shallow recess 44 formed therein; raised portion 40 has a medium recess 46 formed therein; and raised portion 42 has a deep recess 48 formed therein. As shown, treats 18 can be placed in each of these recesses, thus providing different degrees of difficulty for the animal to remove them.

In the embodiment of FIG. 10, side wall 12 of pet toy product T is provided with a triangular recess 50 for receiving a hard treat 52, such as a nut. This form of the invention is particularly attractive for birds, such as parrots, which can use their beaks and/or talons in the space between the corners of the recess and the treat to dislodge the treat.

FIGS. 11 and 12 disclose an embodiment wherein side wall 12 has a recess which extends completely therethrough to form an opening 54 through which a treat 56, such as rawhide can be received.

FIG. 13 discloses an additional embodiment wherein side wall 12 has a plurality of recesses which may include a flexible cup 60 extending beyond the interior edge of side wall 12. As also shown in FIG. 13, when a treat 61 is inserted within the recess, the peripheral side wall of the flexible cup 60 may be deformed to accommodate the shape of the treat. The flexible cup 60 also provides frictional engagement with the treat to assist in retaining the treat within the recess.

FIG. 14 discloses an embodiment wherein side wall 12 has a recess which includes one or more grippers or extensions 62 which assist in retaining the treat 61 within the recess. On the left-side of FIG. 14, the recesses or grippers 62 are illustrated as being approximately midway within the depth of the recess, while the recess on the right-side of FIG. 14 illustrates the grippers or extensions 62 which extend from the outer surface 11.

FIG. 15 discloses in more detail the manner in which a recess from any of the embodiments may conform to treats having different sizes. As shown, two recesses of the same size may hold treats of differing sizes. A recess 64 is enlarged when a larger treat 68 is inserted therein. Conversely, recess 66 is not so enlarged when a smaller treat 69 is inserted therein. The degree to which the side wall 12 can stretch or flex determines the range in which differing sized treats may be placed within the various recesses formed in the side wall 12.

FIG. 16 illustrates another example of two recesses having the same size, one being deformed to receive a treat which has a cross-sectional shape different from that of the unstretched or undeformed recess. More specifically, recesses 70 are provided wherein an elliptical treat 74 will stretch or otherwise deform the peripheral side wall of recess 70, while a round treat 72 more closely conforms to the shape of the recess 70 and therefore, does not deform or stretch its corresponding peripheral side wall of recess 70.

FIG. 17 discloses another embodiment wherein side wall 12 may include a number of other different shaped recesses or openings. As shown, recess or opening 76 has a star-shape, recess or opening 78 has a bone-shape, recess or opening 80 has a crescent-shape opening, and recess or opening 82 has a peanut-shape.

FIG. 18 illustrates yet another embodiment $T_7$ of the pet toy product of this invention. This embodiment includes an outer surface 92 of a side wall 93 (FIG. 21) which is formed in the shape of a round ball to form a substantially closed hollow interior. The side wall 93 includes two opposed side openings 94 which are configured as bone-shaped openings. In addition to the pair of side openings 94, the pet toy product $T_7$ further includes an upper opening 96 and a lower opening 98. As illustrated in FIGS. 18 and 19, the upper and lower openings may be round. Furthermore, lower opening 98 may be of a diameter larger than that of upper opening 96. The terms "side", "upper" and "lower" as applied to side opening 94, upper opening 96 and lower opening 98 are used only to describe their position with respect to FIG. 18. Therefore, these terms will not be interpreted as limiting the location of these openings when the pet toy product $T_7$ is rotated or turned in use. One or more treats 100 may be inserted through the side, upper and lower openings. As shown in FIG. 20, a dog is occupied by the pet toy product $T_7$ wherein a treat 100 is placed in both the side, upper and lower openings.

As shown in FIG. 21, the pet toy product $T_7$ is especially adapted to receive treats 100 in the form of dog biscuits which have a substantially rectangular shape with flared ends thus giving the dog biscuits a bone-shape. These bone-shaped dog biscuits resemble those known as MILK-BONE® biscuits as manufactured by Nabisco. FIG. 21 illustrates three treats 100; two treats being inserted in the side openings 94, and the third treat 100 inserted within upper opening 96.

FIGS. 22 and 23 further illustrate the manner in which the treats 100 are inserted within openings 94 and 96.

FIG. 24 illustrates the manner in which the treats 100 may be broken away from and dislodged from the interior of the pet toy product $T_7$. The left-side of FIG. 24 illustrates a treat 100 which has been broken across its mid-section and wherein a first part of the treat 101 may fall free from the pet toy product, while a second part of the treat 103 falls within the hollow interior of the pet toy product. The treat 100 inserted within opening 96 may be broken in the same fashion as the treat on the left-side of FIG. 24. That is, a first part 105 may break free from the pet toy while a second part 107 falls within the hollow interior. For both the treats 100 on the left-side and upper portion of FIG. 24, the second parts 103 and 107 which fall within the hollow interior of the pet toy product may exit through opening 98. Thus, opening 98 may be sized to allow the parts 103 and 107 to fall therethrough. Alternatively, opening 98 could be made of a smaller size so that the animal must work to dislodge or extract parts 103 and 107 held within the hollow interior. The right-side of FIG. 24 illustrates another way in which a treat 100 may be broken and dislodged from the pet toy product. More specifically, it is possible for the treat 100 to have a first part 109 which breaks away from the pet toy product leaving the remaining portion or part 111 of the treat 100 lodged within opening 94. In this circumstance, the animal could pull the remaining portion or part 111 of the pet treat 100 through opening 94 or the remaining portion or part 111 could be pushed through the opening 94 thus allowing it to fall through lower opening 98 like the other remaining portions 103 and 107.

The particular shape of any of the openings 94, 96 and 98 may be changed to best accommodate the desired treat to be held by the pet toy product. For example, if it is desirable to allow the animal to more easily extract or break a pet treat from the pet toy product, then the openings can be sized to allow the treats to more easily be broken or extracted. Alternatively, openings 94, 96 and 98 can be reduced with respect to the particular desired treat to make it more difficult for the animal to not only break the treat, but also to extract or dislodge it from the hollow interior.

FIG. 25 illustrates a modified treat 102 which extends continuously between side openings 94. It should also be understood that such a pet treat 102 could also extend continuously between openings 96 and 98. As with the description found above with respect to FIG. 24, pet treat 102 may be broken and extracted or dislodged in the same manner as discussed with respect to treats 100.

FIG. 26 is one modification to the embodiment of FIG. 18, wherein round upper opening 96 is replaced by an upper opening 104 having a fish-shape.

FIGS. 27–36 illustrate other examples of shapes that may be incorporated for the upper opening.

FIG. 27 is a fragmentary plan view illustrating an upper opening having an irregular slot-shape 106. FIG. 28 is a fragmentary plan view illustrating an upper opening having a combination triangle and rectangle-shape 108. FIG. 29 is a fragmentary plan view illustrating an upper opening having a slot-shaped with parallel sides 110. FIG. 30 is a fragmentary plan view illustrating an upper opening having a KONG®-shape 112 including dividers 113. KONG® is a registered trademark owned by the applicant of this invention, the shape also being illustrated in Trademark Registration No. 1,972,163. The dividers 113 may simply be thin walled extensions which traverse between the rounded portions of the KONG®-shape. As shown in FIG. 30, there are three dividers 113. These dividers 113 can result in the KONG®-shape having four distinct openings shown as openings 132, 134, 136 and 138, respectively. FIG. 31 is a fragmentary plan view illustrating an upper opening having a KONG®-shape 112 without dividers 113. FIG. 32 is a fragmentary plan view illustrating an upper opening having a cross-shape 116 with rounded ends 117. FIG. 33 is a fragmentary plan view illustrating an upper opening having a bell-shape 118. FIG. 34 is a fragmentary plan view illustrating an upper opening having a butterfly-shape 120. FIG. 35 is a fragmentary plan view illustrating an upper opening having a fanciful cross-shape 122. FIG. 36 is a fragmentary plan view illustrating a modified cross-shape 124. FIG. 37 is another perspective view of the pet toy product embodiment of FIG. 18. FIG. 37 illustrates a modified lower opening 126 which may replace the round lower opening 98 of FIG. 18. As shown, lower opening 126 may have a central circular shape opening which is surrounded by a plurality of extensions 127.

FIGS. 38 and 39 illustrate other modifications to the lower opening 126 of FIG. 37. Specifically, lower opening 128 may include four extensions 129, and lower opening 130 may include five extensions 131.

Each of the openings or recesses described with respect to FIGS. 26–39 provide differing levels of difficulty for the animal to extract a desired treat. Additionally, for those openings in FIGS. 26–39 which include some extension which traverses outwardly from the center axis of the pet toy product, these extensions assist during the manufacturing process by enabling the core (not shown) to be more easily removed. In other words, as shown particularly in FIGS. 38 and 39, rather unique openings may be provided to challenge an animal in dislodging treats from the pet toy product, such unique openings also assisting in the manufacturing process by making it easier for removal of the core.

Although the interiors of the pet toy products of this invention have been shown as being hollow, it is also contemplated that the pet toy products' hollow interiors may be filled with material enabling the pet toy products to float. For example, buoyant Styrofoam®-like material could be placed within the hollow interiors of the pet toy products in order to allow the pet toy products to float. Such a buoyant object could be sized to still allow varying treats to be placed within the various recesses and openings of the pet toy products.

Although separate embodiments have been illustrated, it is to be understood that the characteristics of one or more embodiments can be incorporated within the same pet toy product. For example, as shown in pet toy products $T_1$ and $T_5$, these toys incorporate a combination of recesses 12, 14, 16, 44, 46, 48 and opening 54.

From the foregoing, the advantages of the present invention are readily apparent. A pet toy having various configurations is provided which has recesses or grooves of varying size and depth for releasably receiving one or more animal treats. Because of the varying depth of the recesses, the animal will experience different degrees of difficulty in removing the treats from the pet toy product. Thus, the pet toy product can keep the animal occupied for extended periods of time. The pet toy product can also be used for birds. The owner can replace the treats by inserting them as needed into the recesses. These treats can take the form of dry pet food, liquid or paste snacks, such as peanut butter or soft cheese. Nuts and vegetables pieces can be provided in the recesses when the pet toy product is used for a bird. In other words, any product to which the animal is attracted can be placed in the recesses. Since the toy is not destroyed by the removal of the treats, the toy can be reloaded with additional treats or foods for reuse.

Although this invention has been described with respect to use with pets, it is understood that it can be used with other animals not usually considered as pets.

This invention has been described in detail with reference to particular embodiments thereof, but it will be understood that various other modifications can be effected within the spirit and scope of this invention.

What is claimed is:

1. A pet toy product which includes one or more edible treats to induce an animal to play with said pet toy product, said pet toy product comprising:

a molded body member having a flexible side wall with an outer surface which encompasses a substantially closed hollow interior;

a plurality of recesses geometrically arranged on at least a portion of said outer surface, at least some of said recesses having a peripheral wall with a plurality of peripherally spaced inwardly projecting gripping elements; and an edible treat positioned in said at least one of said plurality of recesses and held in place by said gripping elements.

2. A pet toy product, as claimed in claim 1, wherein:

said plurality of recesses are of varying depths so that said edible treats in said recesses having deeper depths are more difficult for the animal to extract than are said edible treats in said recesses having shallower depths.

3. A pet toy product, as claimed in claim 1, wherein:

at least one of said plurality recesses is generally circular shaped.

4. A pet toy product, as claimed in claim 1, wherein:

at least one of said recesses is generally triangular shaped.

5. A pet toy product, as claimed in claim 1, wherein:

some of said plurality of recesses include a flexible cup portion extending beyond said flexible side wall.

6. A pet toy product, as claimed in claim 1, wherein:

at least one of said plurality of recesses extends through said flexible side wall.

7. A pet toy product, as claimed in claim 1, wherein:

at least one of said plurality of recesses is star-shaped.

8. A pet toy product as claimed in claim 1, wherein:

at least one of said plurality of recesses is bone-shaped.

9. A pet toy product, as claimed in claim 1, wherein:

at least one of said plurality of recesses is peanut-shaped.

10. A pet toy product, as claimed in claim 1, wherein:

at least one of said plurality of recesses is crescent-shaped.

11. A pet toy product which includes one or more edible treats to induce an animal to play with said pet toy product, said pet toy product comprising:

a molded body member having a flexible side wall and an outer surface, a plurality of recesses geometrically arranged on at least a portion of said outer surface;

edible treats positioned in at least some of said plurality of recesses, and at least some of said recesses are side-by-side grooves including a common side wall positioned therebetween.

12. A pet toy product which includes one or more edible treats to induce an animal to play with said pet toy product, said pet toy product comprising:

a molded body member having a flexible side wall and an outer surface;

a plurality of recesses geometrically arranged on at least a portion of said outer surface;

edible treats positioned in at least some of said plurality of recesses; and said outer surface has a plurality of raised areas and at least some of said plurality of recesses are formed respectively in said plurality of raised areas.

13. A pet toy product to induce an animal to play with said pet toy product, said pet toy product comprising:

at least one edible food treat;

a body member having a side wall with an outer surface which encompasses a substantially hollow closed interior, and a plurality of geometrically arranged recesses extending completely through said side wall to form openings, at least one of said openings holding said at least one edible food treat in a fixed position.

14. A pet toy product, as claimed in claim 13, wherein said plurality of recesses further include:

resilient gripping means.

15. A pet toy product, as claimed in claim 13, further including:

a first type of edible food treat in at least one of said plurality of recesses; and a second type of edible food treat in another of said plurality of said recesses.

16. A method of entertaining an animal, said method comprising the steps of:

providing a pet toy having an outer surface with a plurality of recesses of different depths formed therein at least some of the recesses having a peripheral wall with a plurality of peripherally spaced inwardly projecting gripping elements;

inserting a first edible pet treat in at least one of the plurality of recesses so as to be retained within the at least one recess by the gripping elements until dislodged by the animal;

inserting a second edible pet treat in at least one other of the plurality of recesses so as to be retained within the at least one other recess by the gripping elements until dislodged by the animal; and giving the pet toy to the animal.

17. A method, as claimed in claim 16, wherein said inserting step incudes:

frictionally attaching the first and second edible pet treats within the recesses.

18. A method, as claimed in claim 16, wherein said inserting step includes:

using adhesion to secure the first and second edible pet treats within the recesses.

19. A method, as claimed in claim 16, including the further steps of:

reloading at least some of said plurality of recesses with a third edible pet treat after said first and second edible pet treats have been removed from the plurality of recesses by the animal; and returning the pet toy to the animal.

20. A method, as claimed in claim 16, including the further step of:

inserting a plurality of said first or second edible pet treats in at least one of the plurality of recesses.

21. A pet toy product which includes one or more edible treats to induce an animal to play with said pet toy product, said pet toy product comprising:

a body member having a flexible side wall with an outer surface;

a plurality of means for releasably retaining edible treats, said plurality of retaining means being formed through said body member; and an edible treat positioned simultaneously in at least two of said plurality of retaining means.

22. A pet toy product, as claimed in claim 21, wherein:

said body member encompasses a substantial closed hollow interior.

23. A pet toy product, as claimed in claim 21, wherein:

said plurality of releasable retaining means secures said edible treat by friction.

24. A pet toy product, as claimed in claim 21, wherein:

said plurality of releasable retaining means retains said edible treat as by adhesion.

25. A pet toy product comprising:

a body member having a flexible side wall with an outer surface which encompasses a substantially closed hollow interior;

a plurality of recesses arranged across at least a portion of said outer surface, at least some of said recesses having peripheral wall with a plurality of peripherally spaced inwardly projecting gripping elements; and edible treats positioned in at least some of said plurality of recesses and held in place by said gripping elements.

26. A pet toy product, as claimed in claim 25, wherein:

said plurality of recesses are of varying depths so that the edible treats in the recesses having deeper depths are more difficult for the animal to extract than are the edible treats in the recesses having shallower depths.

27. A pet toy product, as claimed in claim 25, wherein at least one of said plurality of recesses includes:

a flexible cup portion extending beyond said flexible side wall.

28. A pet toy product to induce an animal to play with said pet toy product, said pet toy product comprising:

a body member having a flexible side wall and an outer surface which encompasses a substantially closed hollow interior;

a pair of recesses formed through said flexible side wall and positioned on substantially opposite sides of said body member, said pair of recesses each having a desired shape; and at least one edible food treat positioned in at least one of said pair of recesses, said at least one edible food treat having a shape substantially conforming to the shape of the recess in which it is placed.

29. A pet toy product, as claimed in claim 28, wherein:

said body member encompasses a substantial closed hollow interior.

30. A pet toy product, as claimed in claim 29, further including:

a first additional recess positioned approximately 90° from said pair of recesses, said first additional recess being formed completely through said side wall.

31. A pet toy product, as claimed in claim 30, wherein:

another edible treat is placed in said first additional recess.

32. A pet toy product, as claimed in claim 30, further including:

a second additional recess positioned on a substantially opposite side of said body member from said first additional recess.

33. A pet toy product, as claimed in claim 32, wherein:

said first or second additional recess comprises an opening having a larger end and a smaller end.

34. A pet toy product, as claimed in claim 33 wherein said opening further incudes:

at least one divider traversing said opening.

35. A pet toy product, as claimed in claim 32, wherein:

said first or second additional recess has a bell-shaped opening.

36. A pet toy product, as claimed in claim 32, wherein:

said first or second additional recess has a butterfly-shaped opening.

37. A pet toy product, as claimed in claim 32, wherein:

said first or second additional recess has a cross-shaped opening.

38. A pet toy product, as claimed in claim 32, wherein:

said first or second additional recess has an irregular-shaped opening including a plurality of extensions.

39. A pet toy product, as claimed in claim 29, wherein:

said edible treat extends continuously between said pair of opposed recesses and through said hollow interior.

40. A pet toy product, as claimed in claim 28 wherein:

said at least one edible treat is two edible treats, one each of said two edible treats being placed within a corresponding one of said pair of recesses.

41. A method of entertaining an animal, said method comprising the steps of:

providing a pet toy having an outer surface with at least one recess formed therein and an inside surface;

inserting a pet treat in the at least one recess of the plurality of recesses, the pet treat having a portion extending away from the pet toy when inserted therein;

giving the pet toy to the animal;

breaking the portion of the pet treat extending from the pet toy;

causing at least a first part of a remaining portion of the pet treat to fall within the pet toy and be held by an inside surface of the pet toy;

dislodging the at least first part of the remaining portion of the pet treat from within the pet toy.

42. A method, as claimed in claim 41, wherein:

said causing step further includes a second part of the remaining portion being retained within the at least one recess.

43. A method, as claimed in claim 42, further including the step of:

dislodging the remaining portion from within the at least one recess by pulling the remaining portion from the at least one recess.

44. A method, as claimed in claim 41, wherein the at least one recess includes a plurality of recesses and further including the steps of:

providing a first recess of the plurality of recesses having a size to resiliently hold the pet treat therein;

providing a second larger recess of the plurality of recesses; and dislodging the remaining portion of the pet treat from within the pet toy by removing the remaining portion through the second larger recess.

45. A method, as claimed in claim 41, wherein the at least one recess includes a plurality of recesses and said inserting step further includes the step of:

inserting the pet treat simultaneously through two recesses of said plurality of recesses.

* * * * *

UNITED STATES PATENT AND TRADEMARK OFFICE
CERTIFICATE OF CORRECTION

PATENT NO. : 5,947,061
DATED : September 7, 1999
INVENTOR(S) : Joseph P. Markham It is certified that error appears in the above-indentified patent and that said Letters Patent is hereby corrected as shown below:

Column 2, line 43, delete "praised" and insert --are raised--.

Signed and Sealed this

Twenty-second Day of August, 2000

*Attest:*

Q. TODD DICKINSON

*Attesting Officer*      *Director of Patents and Trademarks*